United States Patent [19]

Kawahara et al.

[11] 4,431,702

[45] Feb. 14, 1984

[54] MAGNETIC RECORDING MEDIUM

[75] Inventors: Hiroshi Kawahara; Hitoshi Azegami; Eiji Horigome, all of Tokyo, Japan

[73] Assignee: TDK Electronics Co., Ltd., Tokyo, Japan

[21] Appl. No.: 361,245

[22] Filed: Mar. 24, 1982

[30] Foreign Application Priority Data

Apr. 27, 1981 [JP] Japan .................................. 56-62557

[51] Int. Cl.$^3$ .......................... G11B 5/70; B32B 27/18
[52] U.S. Cl. .................................. 428/422; 252/62.54; 427/128; 428/692; 428/694; 428/900
[58] Field of Search ............... 428/694, 695, 900, 422, 428/411, 692; 252/62.54

[56] References Cited

U.S. PATENT DOCUMENTS

| | | | |
|---|---|---|---|
| 2,866,765 | 12/1958 | Smith | 428/422 |
| 3,490,946 | 1/1970 | Wolff | 428/422 |
| 3,523,086 | 8/1970 | Bisschops | 428/422 |
| 3,993,824 | 11/1976 | Shirahata | 428/900 |
| 4,188,434 | 2/1980 | Lorau | 428/900 |
| 4,232,072 | 11/1980 | Pardee | 428/900 |
| 4,267,238 | 5/1981 | Chernega | 428/422 |
| 4,289,828 | 9/1981 | Ota | 428/694 |
| 4,305,995 | 12/1981 | Ota | 428/694 |

*Primary Examiner*—Ellis P. Robinson
*Attorney, Agent, or Firm*—Oblon, Fisher, Spivak, McClelland & Maier

[57] ABSTRACT

A magnetic recording medium having a magnetic layer comprising a magnetic powder and a resin binder, which is characterized by that the magnetic layer contains an ethylene trifluoride chloride polymer of a low degree of polymerization and a fatty acid ester.

5 Claims, No Drawings

MAGNETIC RECORDING MEDIUM

BACKGROUND OF THE INVENTION

1. Field of the Invention

The present invention relates to a magnetic recording medium having excellent running durability, and more particularly to such a magnetic recording medium which contains ethylene trifluoride chloride and a fatty acid ester.

2. Description of the Prior Art

In magnetic recording media obtained by coating a mixture of a magnetic powder or particulate matter and a binder on a polyester film, the expansion of uses thereof has imposed the requirement of even higher performance on them. For example, in the recent cassette tapes for audio components, video tapes etc., those having more excellent frequency characteristics have been required, and to comply with such a requirement, it has been contemplated to uniformly disperse magnetic particles in a magnetic layer, that is, impart good dispersibility, to enhance the surface properties of the magnetic layer to reduce spacing loss, further to impart appropriate softness to improve the touch with a head, and so forth. However, such a direction is rather disadvantageous in view of running durability, because it tends to increase friction.

On the other hand, the use conditions have become more and more severe because users have been widely spread all over tha world, and therefore the requirement on the durability has become even more severe than ever. The present inventors have been continuously studying on these mutual problems and, as a result, have discovered that the inclusion of ethylene trifluoride chloride and a fatty acid ester in a magnetic layer can reduce friction and hence enhance durability. More specifically, although there have heretofore been known such lubricants as higher fatty acids, silicone oils, ethylene trifluoride chloride (fluorine oil), sorbitan fatty acid esters etc., even these lubricants could not provide a magnetic recording medium having excellent frequency chacteristics as described above.

According to this invention, it has been found that by including an ethylene trifluoride chloride polymer of a low degree of polymerization and a fatty acid ester in a magnetic layer at the same time, a synergistic effect in lubrication is obtained, thereby friction is satisfactorily reduced and durability is improved.

SUMMARY OF THE INVENTION

Accordingly, the present invention provides a magnetic recording medium having a magnetic layer comprising a magnetic powder and a resin binder, which is characterized by that the magnetic layer contains an ethylene trifluoride chloride of a low degree of polymerization and a fatty acid ester.

DETAILED DESCRIPTION OF THE PREFERRED EMBODIMENTS

It is important that the ethylene trifluoride chloride polymer is present in an amount of at least 0.5% based on the resin components, and it has been found that 0.5-5% gave favorable results. If the amount is too much, friction is increased against expectation. The ethylene trifluoride chloride polymer used is preferably of an average degree of polymerization of about 7 to 12 or so. If the degree of polymerization is too low, it becomes viscous and hence a lubricating effect is not obtained. On the contrary, if the degree of polymerization is too high, the compatibility is lowered to render the polymer insoluble in a solvent, and thus making it difficult to use. On the other hand, the fatty acid ester is required to be present in an amount of 1% or more based on the resin components, and it has been found that 1-10% gave favorable results. With a content of less than 1%, the effect was not so good, while the addition of more than 10% did not gave any further effect. The fatty acid ester used is preferably one having 12-18 carbon atoms, and it may be either a monoester, a diester or a triester, or a mixture thereof. With a carbon number of less than 12, the ester has a lower melting point to bring about blooming on the surface, thus not desirable. On the contrary, with a carbon number of more than 18, the ester has a higher melting point, and therefore its solubility is deteriorated. The ratio of the ethylene trifluoride chloride polymer to the fatty acid ester is desirably 1:2 to 5:1 or so by weight.

The present invention is more particularly described by the following examples.

| | |
|---|---|
| $\gamma Fe_2O_3$ Powder | 100 parts |
| Vinyl chloride - vinyl acetate copolymer (VAGH produced by UCC) | 15 parts |
| Urethane resin (#2304 produced by Nippon Polyurethane Co.) | 10 parts |
| Dispersing agent lecithin | 2 parts |
| Ethylene trifluoride chloride (fluorine oil #50 produced by Daikin Kogyo Co.) | 0.3 part |
| Sorbitan monooleate (Emasol 410 produced by Kao Soap Co.) | 1.0 part |
| Methyl ethyl ketone | 80 parts |
| Methyl isobutyl ketone | 80 parts |
| Toluene | 80 parts |

The above composition was kneaded in a ball mill for 36 hours, and then 4 parts of a polyisocyanate (Colonate L produced by Nippon Polyurethane Co.) was added as a crosslinking agent, to obtain a magnetic paint. This was then coated on a polyester film to a thickness of 6 μm, thereby the magnetic particles were orientated, and, after drying, it was surface processed and heat treated at 60° C. for 48 hours to crosslink the binder, to obtain a magnetic tape, which is designated Example 1.

EXAMPLE 2

A magnetic tape was prepared similarly as in Example 1, except that the sorbitan monooleate in Example 1 was replaced by sorbitan trioleate (Emasol 430 produced by Kao Soap Co.). This is designated Example 2.

COMPARATIVE EXAMPLE 1

A magnetic tape was prepared similarly as in Example 1, except that the sorbitan fatty acid ester in Example 1 was excluded. This is designated Comparative Example 1.

COMPARATIVE EXAMPLE 2

A magnetic tape was prepared similarly as in Example 1, except that the ethylene trifluoride chloride in Example 1 was excluded. This is designated Comparative Example 2.

The magnetic tapes obtained in the above Examples 1 and 2 and Comparative Examples 1 and 2 may be summarized on the friction coefficient and running durability as in the following table. The friction coefficient is the tape tension when a Permalloy cylinder of 7 mm in diameter is rotated at 150 rpm and a load of 50 g is applied, the obtained tape tension being converted to the coefficient. The percent failure of running properties is the percentage of generation of e.g. no running, stopping etc. of the samples (n=10) at a temperature of 40° C. and a humidity of 90%.

|  | Kind of Sorbitan Fatty Acid Ester | Ethylene Trifluoride Chloride | Friction Coefficient | Percent Failure of Running Properties |
|---|---|---|---|---|
| Example 1 | Monooleic acid ($C_{18}$) | 0.3 | 0.24 | 0 |
| 2 | Trioleic acid ($C_{18}$) | " | 0.22 | 0 |
| 3 | Monolauric acid ($C_{12}$) | " | 0.26 | 0 |
| 4 | Monopalmitic acid ($C_{16}$) | " | 0.25 | 0 |
| 5 | Monostearic acid ($C_{18}$) | " | 0.25 | 0 |
| 6 | Tristearic acid ($C_{18}$) | " | 0.23 | 0 |
| Comparative Example 1 | None | " | 0.41 | 60 |
| 2 | Monoleic acid ($C_{18}$) | None | 0.46 | 80 |

As demonstrated above, although the fatty acid ester and the ethylene trifluroide chloride low polymer, when used alone respectively, could not prevent the generation of failures, where thay are used in combination as in the Example, much more excellent friction coefficient and running durability are exhibited in any case than in the Comparative Examples. While the magnetic powder used in the Examples was $\gamma$-$Fe_2O_3$, any ferromagnetic material such as $Fe_3O_4$, cobalt-adsorbed $\gamma$-$Fe_2O_3$, metal powder etc. may also be suitably employed in the present invention.

We claim:

1. In a magnetic recording medium of a magnetic layer comprising a magnetic powder and a resin binder on a support, the improvement comprising:
    said magnetic layer additionally containing from 0.5-5% by wt of an ethylene trifluoride chloride polymer of a low degree of polymerization and from 1-10% by wt of a fatty acid ester having a $C_{12}$-$C_{18}$ carbon atom content.

2. The magnetic recording medium of claim 1, wherein said ethylene trifluoride chloride polymer has a degree of polymerization of 7-12.

3. The magnetic recording medium of claim 1 or 2, wherein said fatty acid ester is a sorbitan fatty acid ester.

4. The magnetic recording medium of claim 3, wherein said sorbitan fatty acid ester is a monoester, a diester, a triester or a combination of these esters.

5. The magnetic recording medium of claim 1, wherein the ratio of the ethylene trifluoride chloride polymer to said fatty acid ester ranges from 1:2 to 5:1 by weight.

* * * * *